United States Patent [19]

Lauer et al.

[11] Patent Number: 4,550,627

[45] Date of Patent: Nov. 5, 1985

[54] TRANSMISSION SHIFTING MECHANISM

[75] Inventors: Ernst H. Lauer, Kalamazoo; Joseph D. Reynolds, Climax, both of Mich.

[73] Assignee: Eaton Corporation, Cleveland, Ohio

[21] Appl. No.: 447,346

[22] Filed: Dec. 6, 1982

[51] Int. Cl.[4] .......................... G05G 5/10; G05G 9/12
[52] U.S. Cl. .......................................... 74/475; 74/477
[58] Field of Search .................................. 74/477, 475

[56] References Cited

U.S. PATENT DOCUMENTS

| | | | |
|---|---|---|---|
| 2,487,283 | 11/1949 | Stewart | 74/477 |
| 2,811,865 | 11/1957 | McCarthy | 74/477 |
| 3,242,759 | 3/1966 | Magg et al. | 74/477 |
| 3,367,205 | 2/1968 | Ratliff | 74/477 |
| 3,387,501 | 6/1968 | Frost | 74/335 |
| 3,929,029 | 12/1975 | Kelbel | 74/473 R |
| 3,934,485 | 1/1976 | Ratliff | 74/473 R |
| 4,022,078 | 5/1977 | Malott | 74/475 |
| 4,120,212 | 10/1978 | Philipsen | 74/476 |
| 4,132,125 | 1/1979 | Janiszewski | 74/477 |
| 4,273,004 | 6/1981 | Morrison et al. | 74/473 R |
| 4,275,612 | 6/1981 | Silvester | 74/473 R |
| 4,296,642 | 10/1981 | Schetter | 74/475 |
| 4,320,670 | 3/1982 | Kawamoto | 74/477 |

*Primary Examiner*—Rodney H. Bonck
*Attorney, Agent, or Firm*—C. H. Grace; H. D. Gordon

[57] ABSTRACT

A shifting mechanism (10) for a change gear transmission is provided. The shifting mechanism includes a plurality of axially shiftable shift rails (16, 18, 20 and 22) each of which carry shift forks (24, 26, 28 and 30) for axial movement therewith. Each of the shift rails is provided with a shift notch (34) and a interlock notch (44) all of which will align when the shift rails are in the axially centered neutral positions thereof. A shift shaft-shift finger assembly (76) extends generally transversely to the shift rails and is mounted in the shift mechanism housing (12) for axial movement along and rotational movement about its axis (122). The shift shaft (84) is axially movable in the space partially defined by the peripheral surfaces of the interlock notches. The shift shaft-shift finger assembly defines a gap (118) having a width (120) which is greater than the thickness (42) of one shift rail but less than the thickness of two shift rails and which is aligned with the shift finger (100) fixed for axial and rotational movement with the shift shaft (84) whereby alignment of the shift finger (100) with a selected shift rail will align the gap (118) with the selected shift rail allowing axial movement of the selected shift rail from the axially nondisplaced position thereof and will lock the remaining shift rails in the axially nondisplaced positions thereof. A single detent shaft (66) co-operates with neutral detents (46) and in-gear detents (48) provided in the shift rails and an adjustable resilient detent mechanism (180) and/or collars (158 and 160) provide verification of proper alignment of the shift finger with the middle (18 or 20) shift rails.

24 Claims, 14 Drawing Figures

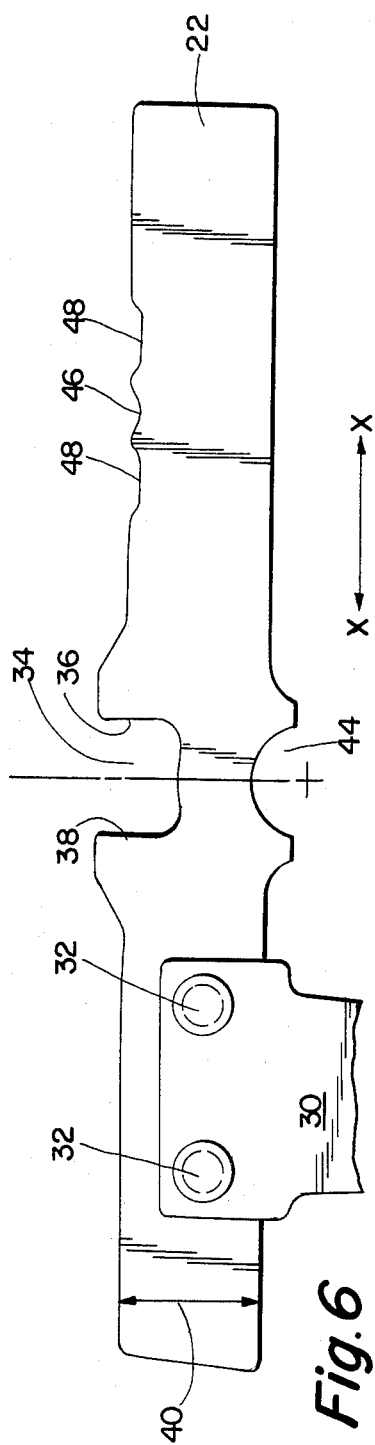
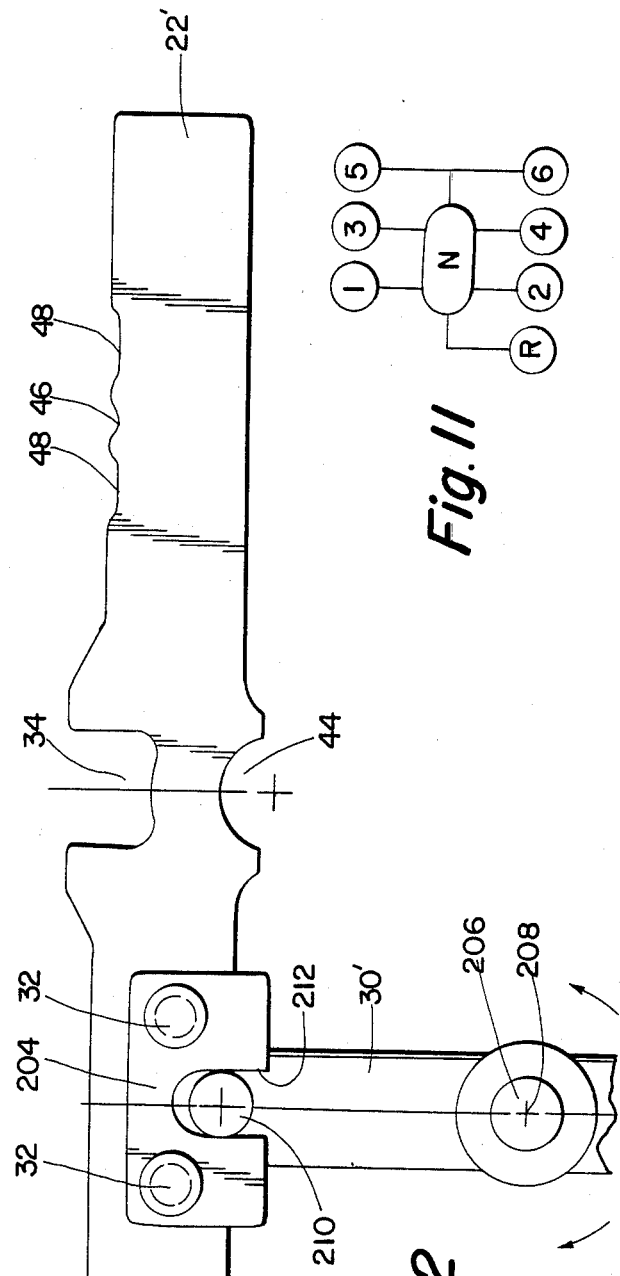
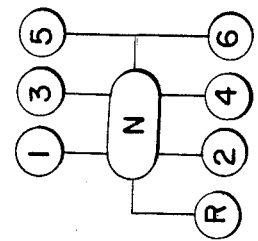
Fig. 6
Fig. 11
Fig. 12

TRANSMISSION SHIFTING MECHANISM

BACKGROUND OF THE INVENTION

1. Field of the Invention

The present invention relates to transmission shifting mechanisms, also commonly referred to gear selector mechanisms, for use in manually controlled transmissions. In particular, the present invention relates to transmission shifting mechanisms which are relatively lightweight, simple, inexpensive and are easily adaptable for direct and/or remote shifting and for left and/or right hand controls.

2. Description of the Prior Art

Manually controlled change gear transmissions of both the sliding gear and/or sliding clutch type, and the shifting mechanisms for selective shifting thereof, are well known in the prior art. In recent years there have been many improvements relating to the shifting mechanisms for such sliding gear and/or sliding clutch type manual transmissions. However, there continues to be a need to provide a relatively inexpensive, relatively lightweight, simplified shifting mechanism for establishing desired shifting movement, for providing adequate feel for the operator to establish that a correct gear has been selected and to allow relatively easy adaptation of the shifting mechanism for both direct and remote control and for both right and/or left handed control. There is also a continuing need to improve the reliability and serviceability of such transmission shifting mechanisms. Additionally, it is desirable to improve the simplicity and reliability of interlock mechanisms utilized with transmission shifting mechanisms having a plurality of axially movable shift rails therein which interlock mechanisms prevent axial movement of more than one shift rail at a given time.

The use of rectangularly cross-sectionally shaped shift rails, also referred to as flat shift rails and flat shift bars, to simplify and reduce the expense of shift bar housing assemblies is known as may be seen by reference to U.S. Pat. No. 4,273,004, hereby incorporated by reference. While the use of such flat shift rails is desirable, the means for mounting, guiding and retaining same within a shift bar housing assembly is subject to improvement.

The use of pin and/or ball type interlock mechanisms is well known in the prior art as may be seen by reference to U.S. Pat. Nos. 3,387,501; 4,120,212 and 4,296,642, hereby all incorporated by reference. While such interlock mechanisms are functionally acceptable, they are relatively complicated and or expensive to produce, assemble and/or service.

Interlock mechanisms of the locking plate type are also well known in the prior art as may be seen by reference to U.S. Pat. Nos. 3,929,029 and 4,132,125, both hereby incorporated by reference. While these plate type interlock mechanisms are functionally acceptable, they are not suited for all types of shifting mechanisms and/or tend to be complicated and/or expensive to manufacture and/or assemble.

Mechanisms for providing an operator with a feel for varification of proper shift rail selection when manually shifting a gear shift lever of a mechanical transmission by use of resilient yieldable means is known in the prior art as may be seen by reference to U.S. Pat. Nos. 3,934,485 and 4,022,078 both hereby incorporated by reference. While such prior art mechanisms are suitable for certain purposes, they tend to be complicated and/or expensive to manufacture, assemble and/or service and/or do not provide the operator with a feel positively indicating correct selection in a shift bar housing assembly having three, four or more shift rails and also were not adjustable to compensate for various shift linkage assemblies which might be utilized with a given transmission.

Directly shifted transmissions wherein the transmission shifting mechanism comprises a shift lever or the like which is mounted directly in a tower assembly mounted to the transmission housing and wherein the transmission shifting lever directly engaged the shift rails of the transmission shift bar housing are well known in the prior art as may be seen by reference to above mentioned U.S. Pat. No. 4,273,004. Remotely controlled transmissions wherein gear changing is controlled by a remotely located master shift lever by means of a linkage assembly are well known in the prior art as may be seen by reference to U.S. Pat. Nos. 3,489,028 and 4,275,612, both hereby incorporated by reference. The prior art transmission shifting mechanisms have been somewhat unsatisfactory as the conversion thereof from a remotely controlled to a directly controlled, or vice versa, shifting mechanism was often complicated, expensive and required the substitution of a large number of parts.

SUMMARY OF THE INVENTION

In accordance with the present invention, the drawbacks of the prior art are overcome or minimized by the provision of a transmission shifting mechanism which is relatively lightweight, relatively simple, relatively inexpensive and easily adaptable for both direct and/or remote control and for both left and/or right hand controls. The transmission shifting mechanism provides an interlock structure which is simple and reliable, provides a simple and inexpensive means for mounting and guiding a plurality of relatively flat shift rails, provides a simple neutral and in-gear detent mechanism, and provides the operator with a means to sense correct selection of both outer and inner shift rails in a shift bar housing assembly having three or four shift rails therein.

The above is accomplished by utilizing a shift shaft mounted in a transmission shift bar housing assembly transverse to the axes of a plurality of generally side by side flat shift rails each of which carry a shift fork or other shifting element thereon. Each of the shift rails is provided with a shift block notch for engagement by a shift finger member and an aligned interlock notch. A shift shaft is utilized with both the remotely controlled and directly controlled version of the shift mechanism. The shift shaft is axially slidable through the interlock notches in the shift rails and designed to contact the shift rails and position and lock all but one of same in a neutral position. The shift finger is fixedly carried by the shift shaft for axial and rotational movement therewith and is aligned with a gap or groove in the shift shaft which is of a width greater than the thickness of one shift rail but less than the thickness of two shift rails whereby only the one shift rail aligned with the shift finger will be permitted axial movement from the neutral position thereof. The shift shaft is axially moved to align the shift finger and gap with a selected shift rail, and to lock the other shift rails in the neutral positions thereof, and then is rotated to displace the shift finger to shift the selected shift rail. In the directly controlled version, a shift lever directly contacts the shift finger and/or shift shaft and/or other member fixed for movement with the shift shaft and shift finger for axial and rotational movement thereof and in the remotely controlled version one end of the shift shaft is attached to a remote control linkage of a known type. The shift rails are mounted in a side-by-side relationship within downwardly facing "U" shaped cavities and are supported by straps which are bolted to the shift bar housing assembly. The shift rails are allowed a predetermined amount of float allowing the rails and the shift yokes carried thereby to move with the sliding clutches without binding. Each of the shift rails is provided with a neutral detent notch all of which will align when all of the shift rails are in the neutral position. A single spring biased detent shaft is utilized to provide a resilient resistance to movement of the shift rails from the neutral positions thereof. Cooperating abutment surfaces are provided on the shift shaft-shift finger assembly and the shift rails to provide a positive stop and indication to the operator that the shift finger and gap in the shift shaft is aligned with a selected one of the outer shift rails. Spring biased collars and/or a spring biased selection detent mechanism is provided for cooperation with ramps provided in the shift shaft for providing a resilient indication of when the shift finger and gap in the shift shaft is aligned with a selected one of the inner shift rails. The bias of the selection detent spring may be adjusted to provide the required feel for various shifting linkage mechanisms to be utilized with the gear shifting mechanism.

Accordingly, an object of the present invention is to provide a relatively lightweight, simple, inexpensive, reliable transmission shifting mechanism which is easily adaptable to both remote and direct control.

Another object of the present invention is to provide an improved transmission shifting mechanism having a simple and reliable interlock mechanism.

A further object of the present invention is to provide a new and improved transmission shifting mechanism utilizing a simple and reliable neutral detent mechanism for resiliently locating the shift rails in the neutral position thereof.

These and other objects and advantages of the present invention will become apparent from a reading of the detailed description of the invention taken in connection with the attached drawings.

BRIEF DESCRIPTION OF THE DRAWINGS

FIG. 6 is a fragmentary side view of a shift rail-shift yoke assembly of the present invention.

FIG. 9 is a sectional view taken along the line 9—9 in FIG. 2.

FIG. 10 is a sectional view taken substantially along the line 10—10 in FIG. 3.

FIG. 11 is a schematic illustration of the shift pattern of the present invention.

FIG. 12 is a fragmentary side view of an alternate shift rail-shift yoke assembly of the present invention as utilized with overdrive type transmission.

DETAILED DESCRIPTION OF THE PREFERRED EMBODIMENT

Figure 1:
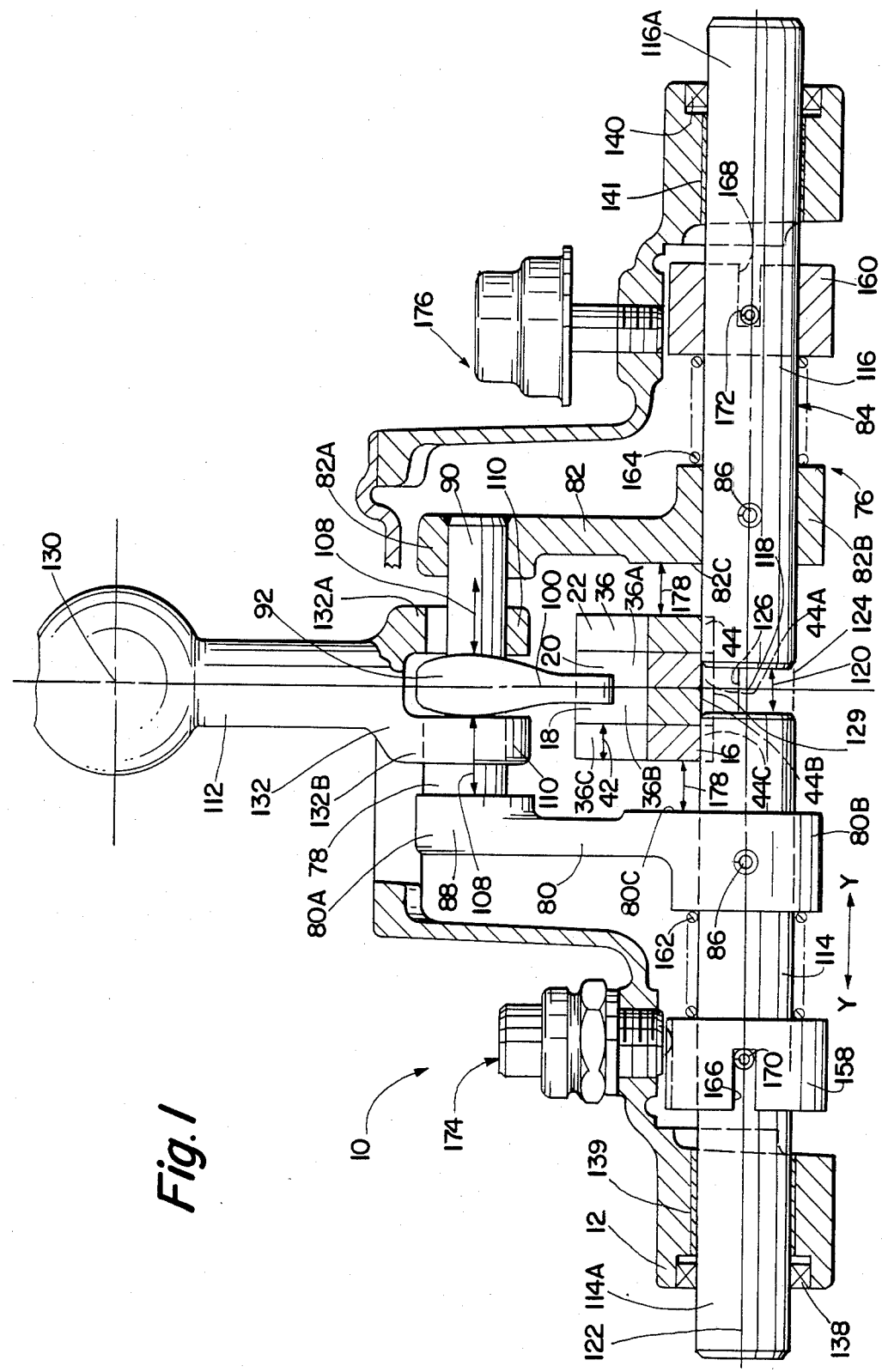
FIG. 1 is a fragmentary sectional front view of the directly controlled transmission shifting mechanism of the present invention.

Certain terms will be utilized in the following description of the preferred embodiments of the present invention and are not intended to be limiting. The terms "forward" and "rearward" refer to directions in the transmission shifting mechanism of the present invention as conventionally mounted in a vehicle. The terms "rightward" and "leftward" refer to directions in the drawings to which reference is made. The terms "inward" and "outward" refer to directions toward and away from, respectively, the geometric center of the device being described. The above applies to modifications of the terms specifically mentioned and terms of similar import.

Multi-speed change gear transmissions of both the sliding gear type wherein selected gears are moved into meshing engagement with other gears and of the sliding clutch type wherein constantly meshed gears are selectively clutched to a shaft by means of a slidable clutch are well known in the prior art and examples thereof may be seen by reference to above mentioned U.S. Pat. Nos. 4,273,004; 3,387,501 and 4,296,642. In such transmissions, the slidable gear or clutch member is provided with a groove in which a shift fork or shift yoke or other shifting element is received for imparting a selected axial movement thereto. The shift forks or yokes are typically carried by, or at least selectively axially moved by, an axially movable shift rail or bar. The shift rails and shift forks carried thereby typically have an axially centered neutral position and are movable in a first and possibly a second axial direction to engage a selected gear. Accordingly, in transmissions of this type, one shift rail and shift yoke is required for at least every pair of selectively engagable gears. Typically, a transmission shifting mechanism, also referred to as a shift bar housing assembly, is mounted to the transmission, usually at the top of the transmission housing, and carries a plurality of axially movable shift rails each of which carries a single shift fork or yoke for axial movement therewith.

Figure 2:
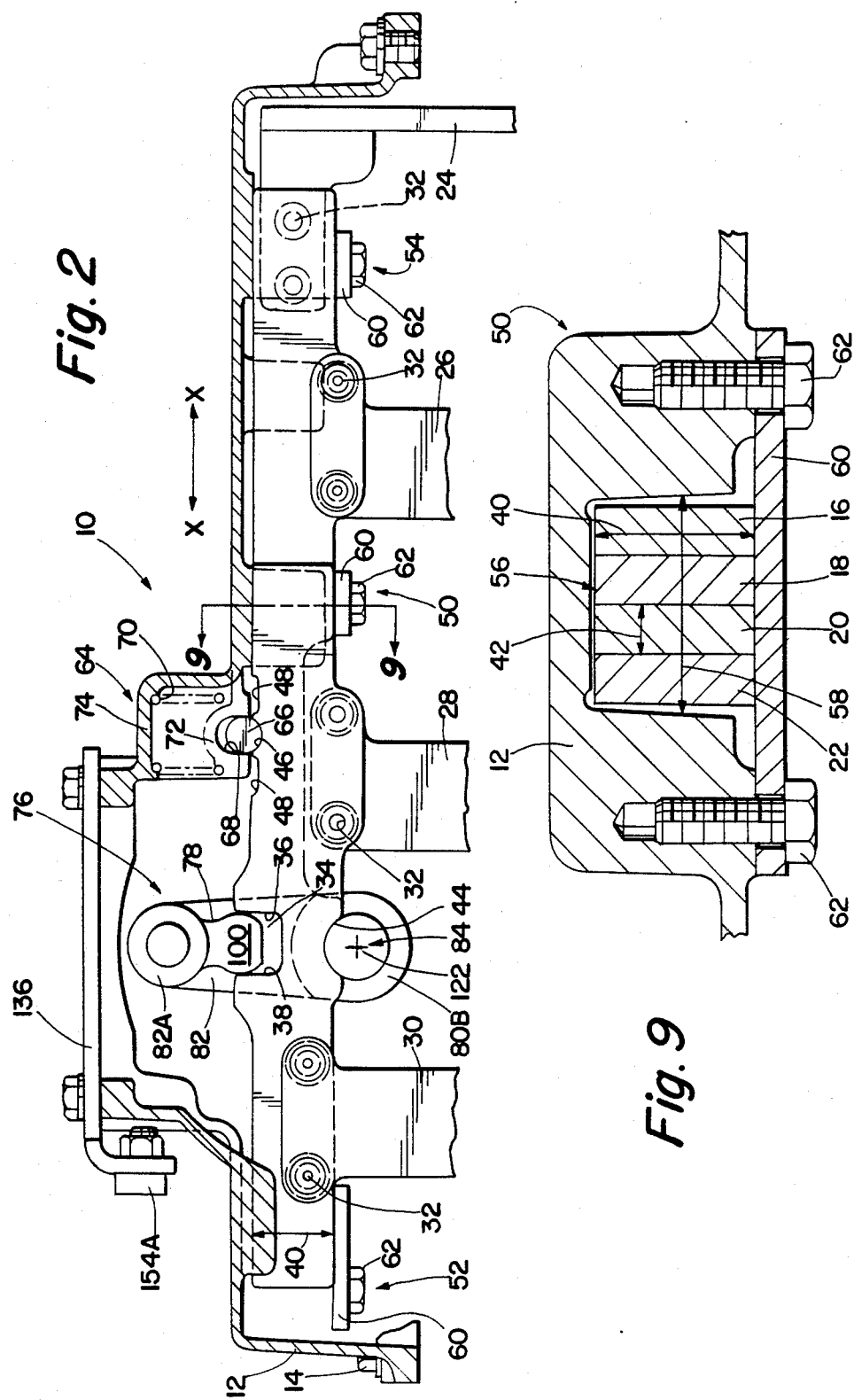
FIG. 2 is a fragmentary side view of the shifting mechanism of the present invention.
Figure 3:
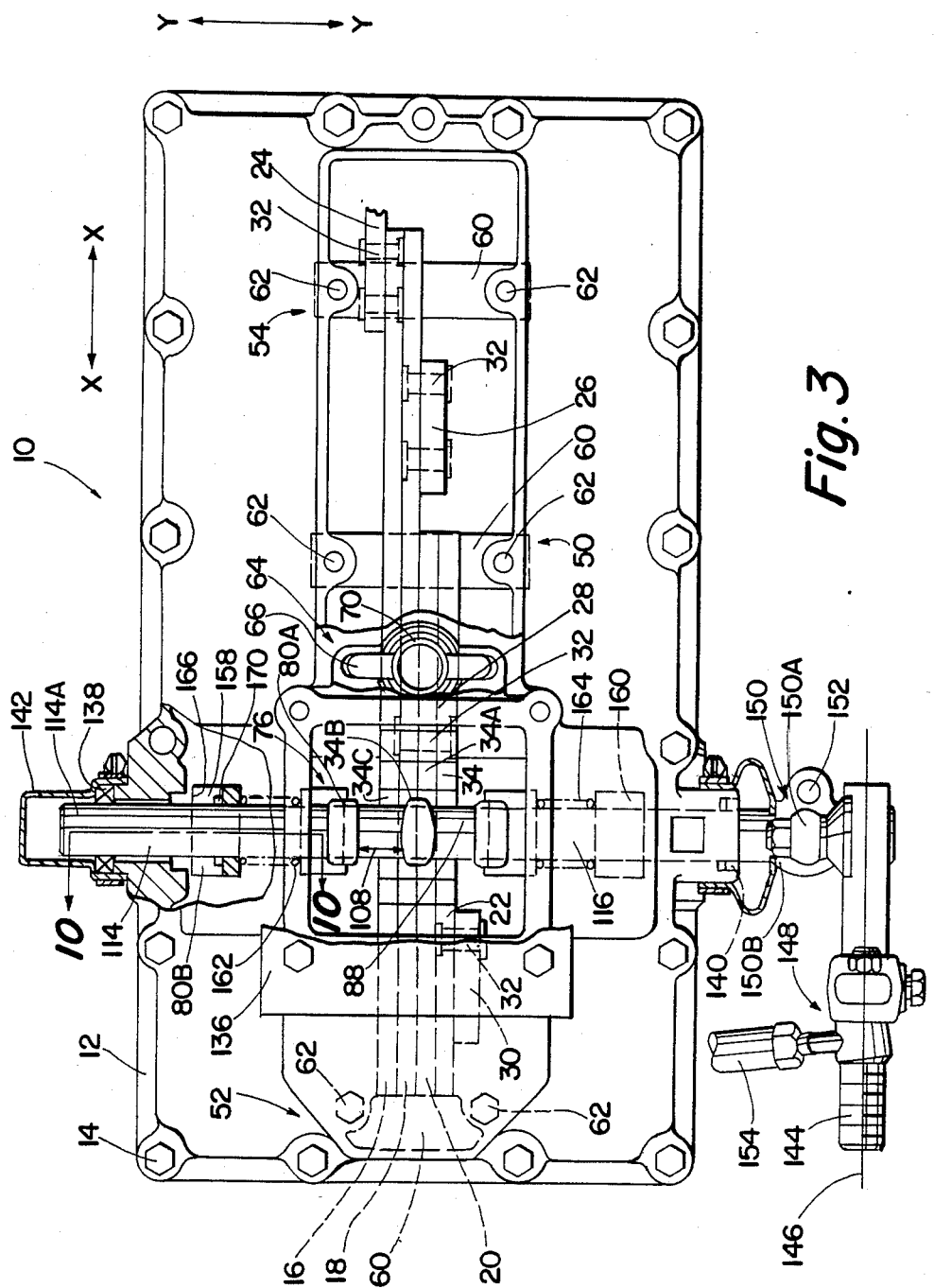
FIG. 3 is a sectional top view of a remotely controlled embodiment of the shifting mechanism of the present invention.

The transmission shifting mechanism, or shift bar housing assembly, 10, of the present invention may be seen by reference to FIGS. 1-3. As will be discussed in greater detail below, the embodiment illustrated in FIG. 1 is slightly different from that illustrated in FIGS. 2 and 3 in that the embodiment illustrated in FIG. 1 is adapted for direct control whereas the embodiment illustrated in FIGS. 2 and 3 is adapted for remote control. The transmission shifting mechanism 10 includes a housing 12 adapted to be mounted to the top of a transmission housing by means of bolts 14 or the like. By way of illustration only, and not of limitation, the shifting mechanism 10 illustrated is utilized with a six forward speed and one reverse speed transmission and includes four generally cross-sectionally rectangular flat shift rails 16, 18, 20 and 22 axially slidable within housing 12. Shift rail 16 is the reverse speed shift rail and carries shift fork or yoke 24 mounted for axial movement therewith. Shift rail 18 is the first and second speed shift rail and carries shift fork 26 mounted for axial movement therewith. Shift rail 20 is the third and fourth speed shift rail and carries shift fork 28 mounted for axial movement therewith. Shift rail 22 is the fifth and sixth speed shift rail and carries shift fork 30 mounted for axial movement therewith. Preferably, the shift forks or yokes are stamped members which are mounted to the shift rails by means of rivets 32 as is shown. As is known, and as indicated above, transmission shifting, or gear engagement, is accomplished by selective axial movement of a selected one of the shift rails from the axially nondisplaced neutral position illustrated in FIGS. 2 and 3.

The structure of the shift rail-shift yoke assemblies may be appreciated in greater detail by reference to FIG. 6 wherein the shift rail 22 and shift yoke 30 assembly is illustrated in greater detail. As is seen, generally flat shift rail 22 is rigidly attached to shift yoke 30 by means of rivets 32 or other fastening means whereby shift rail 22 and shift yoke 30 will move together axially in both the forward and rearward directions. The forward and rearward axial direction indicated by arrow X—X is the shifting direction of the transmission shifting mechanism. Shift rail 22, as well as shift rails 16, 18 and 20, defines a shift finger notch 34 having side walls 36 and 38 which are engageable by a shift finger for imparting a desired axial movement in the direction of arrows X—X to the shift rail and shift yoke carried thereby. As may be seen, the shift finger notches of shift rails 20, 18 and 16, respectively, have been assigned reference numerals 34A, 34B, 34C, respectively. As may be seen, when all of the shift rails are in the neutral position, the shift finger notches thereof are aligned. The shift finger notches may be provided directly in the shift rails or may be provided in members carried by the shift rails. Each of the shift rails is of a generally uniform cross-section having a height 40 and a width 42. On the bottom or lower surface of each of the shift rails, and axially aligned with the shift notch 34, each of the shift rails carries an interlock notch 44 which may be of a generally arcuate shape. Interlock notches 44 could, of course, be through bores. The interlock notches defined by shift rails 20, 18 and 16, respectively, have been assigned reference numerals 44A, 44B and 44C, respectively. As with the shift finger notches, when the shift rails are in the neutral position, all of the interlock notches are aligned. The interlock notches extend through the entire width of each of the shift rails and at least shift finger notches 34B and 34C extend through the entire width of central shift rails 20 and 18. As mentioned above, the shift finger notches and/or the interlock notches could be provided by or in plates or the like fixed to the shift rails.

To provide for both left and right handed controls, the shift rails could be assembled in the order shown in FIG. 1 or could be arranged in the opposite order, 22, 20, 18, 16 from left to right as seen in FIG. 1.

On the upper surfaces thereof, and axially spaced from the shift finger notches 34, each of the shift rails carries a neutral detent notch 46 and at least one in-gear detent notch 48 closely axially spaced to the neutral detent notch. The neutral detent notches 46 extend throughout the width of each of the shift rails and the neutral detent notches on each of the shift rails are aligned when each of the shift rails are in the neutral position. The in-gear detent notches 48 are spaced from the neutral detent notches 46 by a distance generally equal to the axial movement of a shift rail from the neutral position to the in-gear position thereof so that the in-gear detent notch of a shift rail in the in-gear position thereof will align with the neutral detent notches of the other shift rails.

As may be seen by reference to FIGS. 1, 3 and 9, the shift rails 16, 18, 20 and 22 are mounted in side by side sliding relationship within shift bar housing assembly 12. Shift rails 16 and 18 which are relatively longer are supportingly guided at three points along their extension while shift rails 20 and 22 which are relatively shorter are guidingly supported at two points along their axial extension. Support structure 50, which is also typical of support structures 52 and 54, is seen in FIG. 9. Briefly support structure 50 includes a cup portion of shift bar housing 12 which defines a downwardly opening guide pocket 56 having a width 58 slightly greater than the combined width of the shift rails 16, 18, 20 and 22 and a height slightly greater than height 40 of the shift rails. A strap member 60 is attached at the bottom of the guide assembly by means of cap screws 62 and provides a sliding support for the shift rails. Of course, the strap could partially or completely define an upwardly opening "U" shaped cavity. This guide structure is relatively simple and economical and allows relatively easy and simple assembly and removal of the shift rails from the shift bar housing 12. By providing pocket 56 with a slightly greater height than the height 40 of the shift rails the shift rails are permitted a small degree of floating movement to compensate for any misalignment and/or possible radial movement of the shift yokes and clutches moved thereby. This permits the shift rails and yokes to align properly and not to bind thereby reducing the wear thereon. The above assembly is relatively simple, inexpensive and reliable and eliminates the need for relatively expensive and somewhat unreliable rollers and similar type mechanisms previously used in connection with generally flat shift rails.

Shifting mechanism 10 is provided with a neutral and in-gear detent mechanism 64 as may be seen by reference to FIGS. 2 and 3. Neutral and in-gear detent mechanism 64 includes a single detent shaft or pin 66 of any suitable cross sectional shape and having a length greater than the combined width of the shift rails and positioned transversely thereto for upward and downward movement (as seen in FIG. 2) within a guide cavity or slot 68 provided in housing 12. The detent shaft 66 is positioned in slot 68 in alignment with detent notches 46 in the shift rails when the shift rails are in the neutral positions thereof and is spring biased by a spring 70 acting through a spring guide 72 downwardly toward the shift rails for resilient engagement with the notches. Detent shaft 66 will engage the neutral notches 46 provided in the shift rails to resiliently position all of the shift rails in the neutral positions thereof and upon axial movement of a selected one of the shift rails to an in-gear position will also engage the in-gear detent 48 of the selected shift rail to resiliently maintain the selected shift rail in the in-gear position to resist the effects of shift lever whipping and the like. Accordingly, it may be seen that a relatively simple and inexpensive detent structure comprising a single detent member, shaft 66, biased by a single spring may be utilized to resiliently retain all of the shift rails in the neutral position and also to resiliently maintain a selectively axially moved shift rail in the in-gear position thereof. Upper wall 74 of housing 12 provides the upper seat for spring 70.

Shifting mechanism 10 is effective to engage a selected gear by selective axial movement of a selected shift rail in the direction of arrows X—X and locking of the remaining shift rails in the neutral position which is accomplished by selective axial and then rotational movement of the shift shaft-shift finger assembly 76. An identical or substantially identical shift shaft-shift finger assembly 76 is utilized for both the directly and remotely controlled versions or configurations of shift mechanism 10. Shift shaft-shift finger assembly 76 includes a shift finger member 78 which is welded or otherwise fixedly attached to substantially identical arm members 80 and 82 at ends 80A and 82A thereof the other ends of which 80B and 82B are fixed to the shift shaft member 84 for axial and rotational movement therewith as by pin members 86 or the like.

Figures 7, 8:
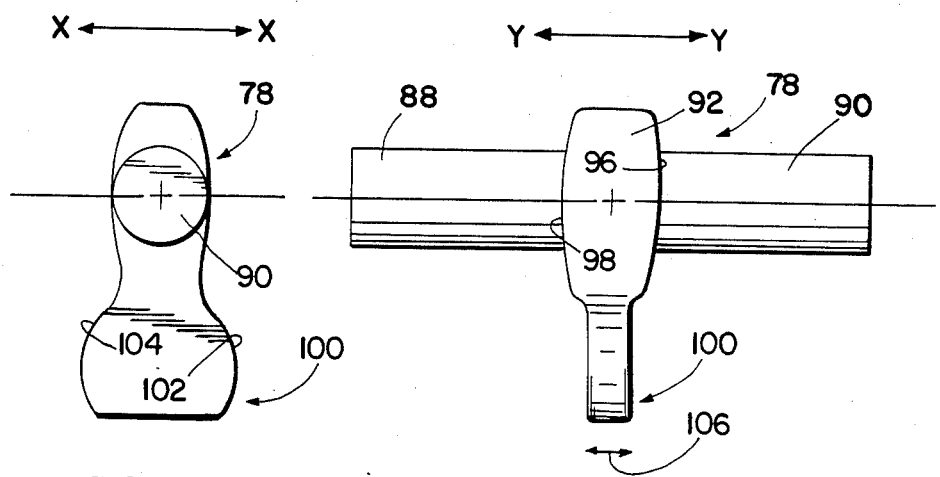
FIG. 7 is a front view of the shift finger member of the present invention.
FIG. 8 is a side view of the shift finger member of the present invention.

Shift finger member 78 may be seen in greater detail by reference to FIGS. 7 and 8 and comprises a pair of substantially identical stub shafts 88 and 90 extending outwardly from a finger section 92 which defines a pair of generally crowned surfaces 96 and 98 adjacent to the stub shafts and an engaging portion 100 defining a pair of generally crowned surfaces 102 and 104 for smooth rolling type contact with the side walls 36 and 38 of the shift finger notches 34. The use of such crowned surfaces in a shifting mechanism to achieve a rolling type contact is known in the prior art as may be seen by reference to U.S. Pat. No. 3,915,027 hereby incorporated by reference. Engagement portion 100 is or a thickness 106 in the direction of arrows Y—Y which is slightly less than the thickness 42 of the shift rails allowing the shift finger when properly aligned to engage a single one of the shift rails only. As will be discussed in greater detail below, it is an important feature of the present invention that both stub shafts 88 and 90 define a separation 108 between the crowned portion 92 and the attachment of the stub shafts to the ends 80A and 82A of arm members 80 and 82 which is sufficient to receive the tine members 110 of a shift lever 112 (as seen in FIG. 1) allowing the shifting mechanism 10 to be utilized as both a direct and remotely controlled mechanism. Although tines 110 preferably engage the crowned portion 92 to prevent rotation of lever 112, tines 110 could also engage arms 80A and 82A or the like.

Shift shaft member 84 comprises two substantially identical coaxial shaft portions 114 and 116 which are separated by a gap or groove 118 which is axially aligned with shift finger engagement portion 100 and which is of an axial length 120 which is greater than the thickness 42 of the shift rails but less than twice the thickness 42 of the shift rails. Shift shaft 84 is axially movable in the direction of arrows Y—Y along its axis 122 which is transverse to the axes of the shift rails and is of a radius slidably receivable within the space defined by the peripheral surfaces of the interlock notches 44 of the shift rails for interferring engagement therewith to prevent axial movement of a shift rail if not axially aligned in the direction of arrow Y—Y with gap 118. Accordingly, alignment of engagement portion 100 of shift finger member 78 with a selected shift rail by movement of the shift shaft-shift finger assembly 76 in the direction of arrow Y—Y will also align gap 118 with the selected shift rail allowing axial movement of the selected shift rail from the neutral position thereof while simultaneously positioning the shift shaft member 84 into interferring engagement with the interlock notches 44 of the remaining shift rails thereby preventing axial movement of the remaining shift rails. Accordingly, a relatively simple, inexpensive and reliable interlock mechanism is provided which does not rely upon the sliding movement of pin members or ball members, does not rely upon spring bias means and does not rely upon relatively complicated plate structures has been provided. As may be seen by reference to dotted lines 124 and 126 in FIG. 1, shift shaft member 84 could be provided as a single shaft member provided with a notch or groove 129 of sufficient depth to allow movement of the selected shift rail which notch or groove would operate in a functionally identical manner to gap 118.

Movement of shift shaft assembly 84 along its axis in the direction of arrows Y—Y to align the shift finger 78 and the gap 118 with a selected shift rail is usually referred to as the selection operation of the shifting mechanism 10 and movement of the shift finger 78 in the direction of arrow X—X to cause a corresponding movement of a selected shift rail, usually accomplished by pivoting shift shaft 84 and shift finger 78 about the axis 122 of shift shaft assembly 84, is referred to as the shifting operation of shifting mechanism 10. In both the directly controlled configuration of shifting mechanism 10 as seen in FIGS. 1 and 5 and in the remotely controlled configuration of shifting mechanism 10 as seen in FIGS. 3 and 4, the selection operation is accomplished by imparting a selected axial movement to the shift shaft 84 assembly and shift finger 78 carried thereby and the shifting operation is accomplished by imparting a selected rotation to shift shaft assembly 84 and shift finger 78 carried thereby about the rotational axis 122 of the shift shaft assembly 84.

In the directly controlled configuration of shifting mechanism 10 a tower assembly is utilized comprising a tower housing 128 which is attached to the shift bar housing by means of cap screws or the like (not shown) and in which a conventional shift lever 112 is mounted for pivotal movement about a fulcrum or pivot point 130 for pivotal movement in both the X—X and Y—Y directions as is well known in the prior art and as may be seen in greater detail by reference to U.S. Pat. No. 3,850,047 hereby incorporated by reference. The specific structure of the tower assembly utilized, and of lever 130 may be of any known construction and the specific configuration thereof forms no part of the present invention. Briefly, the lower end 132 of the shift lever 112 is bifurcated to define two tines 110 each of which tines is provided with a downwardly opening slot 134 in which the stub shafts 88 and 90 of the shift finger member 78 are slidably received. The space between the tines 110 is sufficient to allow the tines to straddle the crowned portion 92 of the shift finger member 78 whereby pivotal movement of the shift lever 112 in the Y—Y direction will impart an axial movement to the shift shaft-shift finger assembly for selection purposes and pivotal movement of the shift lever 112 in the X—X direction will impart a rotational or pivotal movement of the shift shaft-shift finger assembly about the pivotal axis 122 of the shift shaft member 84 to axially displace the shift finger engagement portion 100 in the axial direction defined by arrows X—X for the shifting operation. In FIG. 5, the shift lever 112 and shift finger member 78 is shown in dotted lines in the neutral positions thereof and in solid lines in the axially displaced position thereof wherein a selected shift rail is axially moved.

Figure 4:
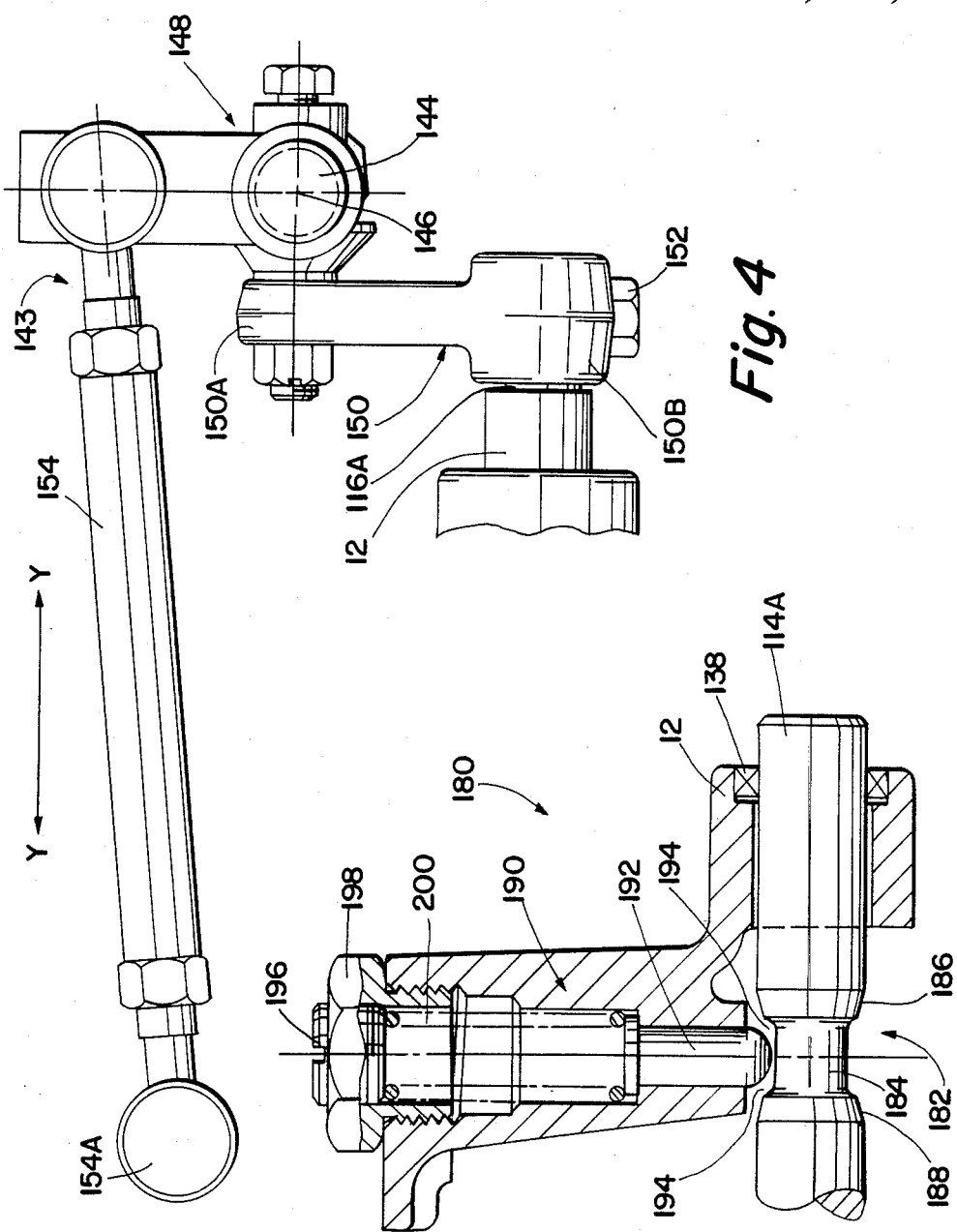
FIG. 4 is a fragmentary front view of a portion of the remote control shifting linkage utilized with the shifting mechanism illustrated in FIG. 3.
Figure 5:
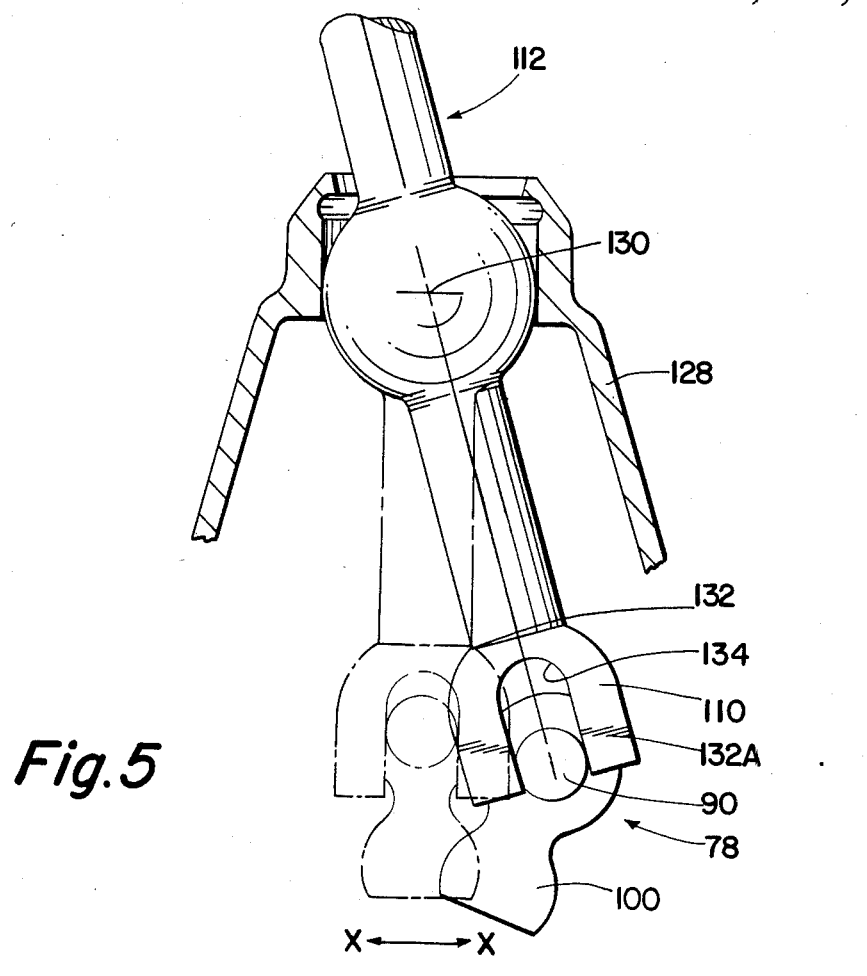
FIG. 5 is a fragmentary side view, partially in section, of a shift lever mechanism suitable for use in connection with the directly controlled embodiment of the present invention.

In the remotely controlled configuration of shifting mechanism 100, as seen in FIGS. 3 and 4, the tower assembly 128 and shift lever 112 are omitted and a plate 136 is utilized to seal the opening to the shift bar housing at which the tower assembly would be mounted. The outer ends 114A and 116A of the shift shaft sections 114 and 116, respectively, are slidably and sealing supported in seals 138 and 140 and bushings 139 and 141 provided in the shift bar housing and a boot or cap member 142 may be provided at one end of the shift shaft member as is seen in FIG. 3. In the directly controlled configuration of shifting mechanism 10 a boot or seal mechanism 142 will be provided at both ends of the shift shaft member. A remote control mechanism or linkage 143 is associated with the righthand end 116A of the shaft member 116 of the shift shaft-shift finger assembly 76 for imparting a selective axial and rotational movement thereto. It is understood, that the remote linkage mechanism 143 could be associated with either selected end of the shift shaft 84 allowing easy modification to a left or right control system. The remote control mechanism or linkage includes a control rod 144 having one end attached to a crank mechanism (not shown) of known type operated by a remotely located master shift lever (not shown) for imparting a selected rotational and axial movement thereto as is well known in the prior art examples of which may be seen by reference to U.S. Pat. Nos. 2,040,594; 3,857,299 and 4,104,929 all hereby incorporated by reference. Control rod 144 is selectively axially movable along its axis 146 in the X—X direction and is pivotally rotatable about its axis. Control rod 144 is mounted to a ball joint assembly 148 which in turn is fixedly attached to a torque arm member 150 at one end 150A thereof the other end of which 150B thereof is fixedly attached to an end 116A of the shift shaft member 84 by means of a clamp and/or splined connection 152 for axial and rotational movement with the shift shaft assembly. The ball joint assembly 148 is also pivotably attached to a pivot link 154 which is pivotably attached to the shift bar housing cover as of 154A. Accordingly, as may be seen and is well known in the prior art, rotation of control rod 144 about its axis 146 will react against the pivot link 154 through torque arm 150 to cause a selective axial movement of the shift shaft-shift finger assembly 76 for selecting a selected shift rail. Axial movement of control rod 144 along its axis 146 will result in a pivotal movement being applied to the shift shaft-shift finger assembly through torque arm 150 for axially moving a selected shift rail along its axis in the direction of X—X for the shifting operation of shift mechanism 10.

As may be seen, the shifting mechanism 10 may be converted from a directly controlled configuration to a remotely controlled configuration, and vice versa by utilization of a tower assembly 128 and shift lever 112 and cap members 142 on both ends of the shift shaft 84 or by utilization of a cover plate 136 removal of a selected cap member 142 and attachment of a remote linkage assembly 143. With the exception of the above mentioned changes, the shifting mechanism 10 for both remote and direct control is identical and changing from one configuration to the other is relatively simply and easily accomplished. Of course, other well known remote control linkages for imparting a selected axial and rotational movement to the shift shaft-shift finger assembly can be utilized and the use thereof is fully contemplated within the scope of the present invention. The shift pattern for the six forward speeds, one reverse speed transmission utilizing the shift mechanism 10 of the present invention is schematically illustrated in FIG. 11. As will be described in greater detail below, the same shift pattern will be utilized for both the overdrive and standard gearing arrangements of the transmission. To select either fifth or sixth speed operations of the transmission, the shift finger engagement portion 100 and the gap 118 between the shift shaft portions should align with shift rail 22. Similarly for third or fourth speed operations of the transmissions alignment should be with shift rail 20, for first or second speed operations alignment should be with shift rail 18 and for reverse operation alignment should be with shift rail 16. To assure proper operation, it is important that the operator be provided with an indication, or feel that the shift finger engagement portion 100 and gap 118 are properly aligned with the desired shift rail and such indication should be positive and operable for all direct and remote control configurations of the shift mechanism 100.

Shift shaft portions 114 and 116 may each carry a sleeve or collar 158 and 160, respectively for positive inward axial movement therewith and under the bias of springs 162 and 164 outward axial movement therewith as may be seen in FIGS. 1 and 3. Sleeves 158 and 160 are provided with outwardly opening slots 166 and 168 in which are received pins 170 and 172 allowing independent movement of the sleeves and shaft sections in one direction only. Collars 158 and 160 are spaced from a contact point on the housing by a distance equal to the axial movement of shift shaft 84 from the position shown to a position aligning finger 100 with one of the inner shift rails, 18 or 20, to provide a resilient feel of proper selection of the inner shift rails. One or more neutral sensing and safety starting switches 174 may be utilized to sense a neutral centered position of the shift shaft-shift finger assembly to prevent starting of the vehicle in the event the transmission is not in neutral. Devices of this type are well known in the prior art and the specific structure thereof forms no part of the present invention. A breather 176 may be utilized to prevent pressure lock to save the seals 138 and 140.

As best seen in FIG. 1, in the centered neutral position of the shift mechanism 10 the axial clearance 178 between the axially inner surfaces 80C and 82C of arm members 80 and 82, respectively, and the outer surfaces of outer shift rails 16 and 22 is sufficient to allow movement of the shift shaft-shift finger assembly axially only sufficient to align the shift finger engagement portion 100 and gap 118 between the shift shaft portions with either one of the outer shift rails 16 or 22. Accordingly, full axial displacement of the shift shaft-shift finger assembly rightwardly or leftwardly to align the shift finger engagement portion 100 and gap 118 between the shift shaft portions with one of the outer shift rails will result in a firm contact between one of the arms 80 and 82 with the other of the outer shift rails 16 or 22, respectively, thus providing a stop for the shift shaft-shift finger assembly and providing a firm positive indication of correct alignment with the selected outer shift rail for selecting either the reverse mode of operation or the fifth or sixth speed mode of operation of the transmission. Accordingly, verification of proper selection of the outer shift rails, 16 or 22, is accomplished by a positive stop of axial movement of the shift shaft-shift finger assembly.

In place of, or in combination with collars 158 and 160, verification of proper selection of one of the inner shift rails 18 or 20 for selection of first or second and third or fourth speed operation of the transmission is accomplished by means of an adjustable selection detent groove mechanism 180 best seen by reference to FIG. 10. Shift shaft portion 114 is provided with a selection detent groove 182 comprising an elongated reduced diameter portion 184 and axially and radially outwardly extending ramp portions 186 and 188. A spring biased selection detent plunger assembly 190 includes a plunger member 192 which extends radially inward toward the axis of shift shaft portion 114 by a distance insufficient to contact reduced diameter portion 184 but sufficient to contact ramp portions 186 and 188. In the neutral position of the shift shaft-shift finger assembly 76, the plunger member 192 will be centered in the reduced diameter portion 184 of the selection detent groove 182 with a clearance 194 on each side thereof sufficient to allow alignment of the shift finger contact portion 100 and gap 118 between the shift shaft portions with either of the central rails 18 or 20 at the point of contact of the plunger member 92 with one of the ramps 188 and 186. Accordingly, axial movement of the shift shaft-shift finger assembly 76 to bring one of the ramp portions 188 or 186 of the selection detent groove 182 into initial contact with resiliently biased plunger 192 will verify that the shift finger and notch has been properly aligned with one of the two axially inner shift rails. As the magnitude of the verifying force of the detent mechanism 182 should be variable to accommodate various direct and remote control linkage configurations, the biasing force on shift plunger 192 may be modified or varied by means of rotation of an adjustment screw 196 received within insert 198 for varying the spring force of detent spring 200 acting upon the detent plunger 192. Of course, the ramp configurations may be modified as required.

Accordingly it may be seen that a positive verification by a stop mechanism has been provided for verifying proper selection of the outer shift rails and a variable resilient detent verification of proper selection of the inner shift rails has been provided.

As is known, in conventional transmissions high speed operation, or highest gear operation, is conventionally a mode of operation wherein the input shaft and output shaft of the transmission rotate at the same speed and the output shaft is clutched directly to the input shaft. In overdrive transmissions, a gear reduction of less than 1:1 is provided and direct clutching of the input shaft to the output shaft is usually the second highest speed mode of operation. To provide the same standard shift pattern, preferably of the "H" type, for both standard and overdrive configurations of a transmission, it is required that some means be provided whereby in the overdrive configuration of the transmission the axial movement of the shift rail controlling engagement of the high speed gear is opposite to that provided for the conventional configuration of the same transmission for a given movement of the shift finger. The above is well known in the prior art and the basic concept of providing such a mechanism forms no part of the present invention. A particular mechanism for providing such operation for an overdrive version of a transmission may be seen by reference to FIG. 12 wherein the fifth and sixth speed shift rail 22' is provided with a unique connection to a shift fork 30' for reversing the direction of axial movement of the clutch or gear controlled by the shift fork 30' in response to a given axial movement of shift rail 22'. As has been described above, in conventional shift rail-shift yoke assemblies, the shift yokes are fixed to the shift rails for axial movement therewith. For controlling the overdrive portion of a transmission while maintaining a standard shift pattern it is desirable that the clutch controlled by the shift rail move in an equal but axially opposite direction from that conventionally provided. Shift rail 22' has fixed for axial movement therewith a notched mounting member 204 attached by rivets 32 or the like shift fork 30' is provided with a pivot mounting 206 at its midpoint by which the shift fork is mounted for pivotal movement about a pivot axis 208 fixed relative to the transmission housing and a pin 210 slidably received within a downwardly opening notch 212 provided in the mounting plate 204. Accordingly, a rightward axial movement of shift rail 22' will result in an equal but opposite axial movement of the remote end (not shown) of shift yoke 30' and the clutch member controlled thereby. In all other respects, the function and configuration of shift rail 22' is identical to that shift rail 22 described above.

Figure 13:
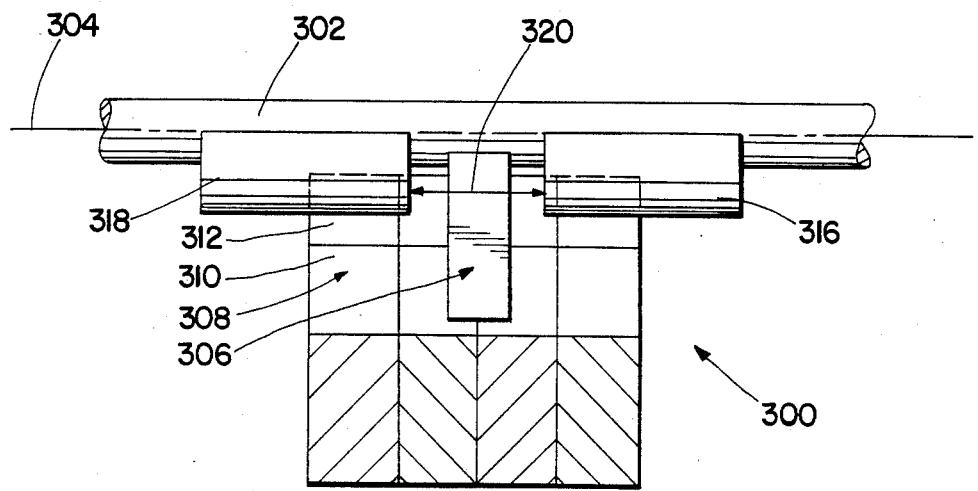
FIG. 13 is a fragmentary front view of an alternate shift shaft assembly.
Figure 14:
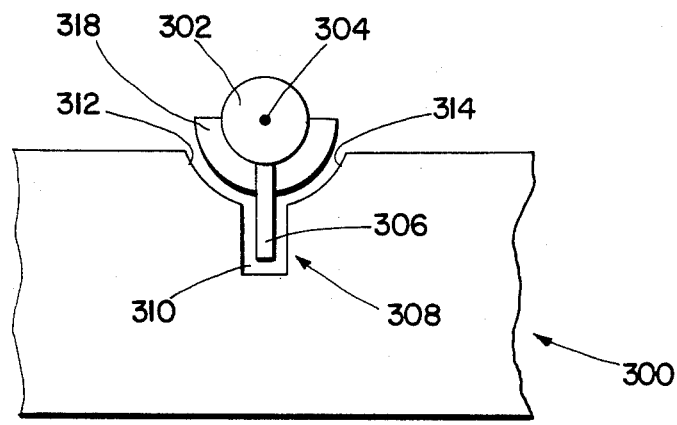
FIG. 14 is a fragmentary side view of the alternate embodiment of FIG. 13.

An alternate embodiment of a shift shaft-shift rail interlock assembly 300 may be seen by reference to FIGS. 13 and 14. Shift shaft 302 is axially movable along and rotatable about axis 304 and carries a shift finger 306 fixed thereto. The shift rails are provided with a combined notch structure 308 comprising a generally straight sided finger notch portion 310 and an outwardly flaired interlock notch portion defined by outwardly flaired walls 312 and 314.

The shaft 302 is provided with two enlarged diameter lobes 316 and 318 which are axially spaced on either side of finger 306 by a distance 320 which is greater than the thickness of one shift rail but less than the thickness of two shift rails. Briefly, the gap or groove between lobes 316 and 318 is functionally similar to gap 118 discussed above and the lobes will allow full rotation of shift shaft 302 and shift finger 306 about axis 304 and will engage the outwardly flaired walls 312 and 314 of all shift rails except that shift rail aligned with finger 306 to lock the nonselected shift rails in the neutral positions thereof. Accordingly, portions 310 define shift finger notches while walls 312 and 314 define interlock notches.

As may be seen, Applicants have provided a new and improved transmission shifting mechanism, or shift bar housing assembly, which provides a relatively simple but positive interlock mechanism, which is relatively easily and simply converted between direct and remotely controlled configurations thereof, which is relatively easily and simply converted between right and left handed controlled configurations thereof, which provides the operator verification of proper selection of a desired shift rail, and which provides economical mounting and guiding of flat shift rails.

It is understood that changes in the detail and arrangements of the components of the above described embodiments may be resorted to without departing from the spirit and scope of the invention as hereinafter claimed.

I claim:

1. A shifting mechanism for a change gear transmission comprising;

a shift mechanism housing mountable to a change gear transmission;

a plurality of substantially parallel generally equal width shift rails mounted in aligned side-by-side relationship for selective axial movement in said housing, each of said shift rails operatively connected to shift elements for engaging and disengaging selected gears, each of said shift rails having an axially nondisplaced neutral position and at least one axially displaced in-gear position, each of said shift rails having means defining a transversely extending shift notch on one of the upper and lower surfaces thereof adapted for engagement by a shift finger and means defining a transversely extending through interlock notch on one of the upper and lower surfaces thereof, all of said shift notches aligning when all of said shift rails are in an axially nondisplaced neutral position, all of said interlock notches aligning when all of said shift rails are in an axially nondisplaced neutral position;

a shift shaft-shift finger assembly mounted in said housing for axial movement along and rotatable movement about an axis extending substantially transverse to the axes of said shift rails, said shift shaft-shift finger assembly comprising a shift shaft mountable in said housing for axial movement along and rotational movement about its axis in said housing, said shift shaft axially slidable within the space partially defined by the peripheral surfaces of said interlock notches of those shift rails in the nondisplaced neutral positions thereof and adapted to interfere with the peripheral surfaces of said interlock notches to prevent substantial axial movement of said shift rails from the axially nondisplaced neutral positions thereof, said shift shaft defining a gap therein having a width greater than the thickness of one shift rail but less than the thickness of two shift rails, said gap permitting axial movement therethrough of a shift rail aligned therewith from the axially nondisplaced position of said shift rail aligned with said gap, said shift shaft-shift finger assembly further comprising a shift finger fixed to said shift shaft for axial movement along and rotational movement about the axis of said shift shaft therewith and having a surface engagable with the shift notch of an aligned shift rail for imparting a selected axial movement to said aligned shift rail, said shift finger aligned with said gap whereby alignment of said shift finger with a selected shift rail will align said gap with said selected shift rail allowing selected axial movement of said selected shift rail while preventing substantial axial movement of all of the shift rails not aligned with said shift finger from the axially nondisplaced neutral position thereof; and means drivingly attachable to said shift shaft-shift finger assembly to selectively axially move said assembly along the axis of said shift shaft and to selectively rotate said assembly about the axis of said shift shaft.

2. The shifting mechanism of claim 1 wherein said interlock notches are formed on the other of the upper and lower surfaces of said shift rail.

3. The shifting mechanism of claim 2 wherein said shift notches and said interlock notches are axially aligned on said shift rails.

4. The shifting mechanism of claim 3 wherein said shift rails are each of a substantially identical substantially rectangular cross-section defined by parallel side walls and parallel top and bottom walls, said shift notches provided in said top walls of said shift rails and said interlock notches provided in said bottom walls of said shift rails, said shift and interlock notches extending from side wall to side wall of said shift rails.

5. The shifting mechanism of claim 1 wherein said shift rails are received in at least one pocket formed in said housing having a generally "U" shaped cross-section of a width generally equal to the combined width of said shift rails, a height slightly greater than the height of said shift rails and further comprising a strap supporting the bottom surfaces of all of said shift rails, said strap attachable to said housing by means of cap screws associated with each end thereof and extending into said pocket structure.

6. The shifting mechanism of claim 1 wherein said shift rails are stampings and said shift notches and said interlock notches are formed directly in said shift rails.

7. The shifting mechanism of claim 1 wherein said shifting elements are shift yokes.

8. A shifting mechanism for a change gear transmission comprising;

a shift mechanism housing mountable to a change gear transmission;

a plurality of substantially parallel, generally equal width shift rails mounted for selective axial movement in said housing, each of said shift rails operatively connected to shift elements for engaging and disengaging selected gears, said shift rails each of a substantially identical substantially rectangular cross-section defined by parallel side walls and parallel top and bottom walls, each of said shift rails having an axially nondisplaced neutral position and at least one axially displaced in-gear position, each of said shift rails having a transversely extending shift notch in the top wall thereof adapted for engagement by a shift finger and a transversely extending interlock notch axially aligned with the shift notch in the bottom wall thereof, said shift and interlock notches extending from side wall to side wall of said shift rails, all of said shift notches aligning when all of said shift rails are in an axially nondisplaced neutral position, all of said interlock notches aligning when all of said shift rails are in an axially nondisplaced neutral position;

a shift shaft-shift finger assembly mounted in said housing for axial movement along and rotatable movement about an axis extending substantially transverse to the axes of said shift rails, said shift shaft-shift finger assembly comprising a shift shaft mountable in said housing for axial movement along and rotational movement about is axis in said housing, said shift shaft axially slidable within the space partially defined by the peripheral surfaces of said interlock notches of those shift rails in the nondisplaced neutral positions thereof and adapted to interfere with the peripheral surfaces of said interlock notches to prevent substantial axial movement of said shift rails from the axially nondisplaced neutral positions thereof, said shift shaft defining a gap therein having a width greater than the thickness of one shift rail but less than the thickness of two shift rails, said gap permitting axial movement therethrough of a shift rail aligned therewith from the axially nondisplaced position of said shift rail aligned with said gap, said shift shaft-shift finger assembly further comprising a first and a second arm member each fixed to said shift shaft for axial and rotational movement therewith and extending radially therefrom and a bridge member extending substantially parallel to said shift shaft axis and spaced therefrom from the remote end of said first arm member to the remote end of said second arm member, said shift finger fixed to and extending from said bridge member raidally toward the axis of said shift shaft for axial movement along and rotational movement about the axis of said shift shaft therewith and having a surface engagable with the shift notch of an aligned shift rail for imparting a selected axial movement to said aligned shift rail, said shift finger aligned with said gap whereby alignment of said shift finger with a selected shift rail will align said gap with said selected shift rail allowing selected axial movement of said selected shift rail while preventing substantial axial movement of all of the shift rails not aligned with said shift finger from the axially nondisplaced neutral position thereof; and means drivingly attachable to said shift shaft-shift finger assembly to selectively axially move said assembly along the axis of said shift shaft and to selectively rotate said assembly about the axis of said shift shaft.

9. The shifting mechanism of claim 8 wherein said shift rails are received axially between said first and second arm members.

10. The shifting mechanism of claim 9 wherein said shift shaft comprises a first shaft member and a second coaxial shaft member, said gap defined by the space between the opposed ends of said first and second shaft members.

11. The shifting mechanism of claim 9 wherein said shift rails are aligned in side by side relationship, and said first and said second arm members are axially spaced by a distance wherein alignment of said shift finger with the shift rail most distant from an arm member will cause said arm member to engage the shift rail closest thereto thereby providing a positive stop for axial movement of the shift shaft-shift rail assembly and further providing positive verification of correct alignment of the shift finger and gap with the shift rail furthest spaced said arm member.

12. The shifting mechanism of claim 11 wherein four axially slidable shift rails are provided and said shift shaft is provided with a selection detent groove comprising a central reduced diameter portion and first and second outwardly ramped portions at each end thereof and a resiliently biased selection detent plunger extends from said housing radially inwardly towards the axis of said shift shaft, said resiliently biased selection plunger initially engagable with one of the first and second ramps on said shift shaft when said shift finger and gap is aligned with one of the axially centered shift rails to provide resilient verification of proper selection of said selected one of said axially centered shift rails.

13. The shifting mechanism of claim 12 wherein the bias of said spring biased selection detent plunger is adjustable from the exterior of said housing.

14. The shifting mechanism of claim 12 wherein resilient biasing means are provided for urging said shift shaft-shift finger assembly to an axially centered position wherein said shift finger and said gap are aligned with the adjacent side walls of the two central shift rails and all of said shift rails are prevented from moving axially from the axially nondisplaced neutral positions thereof.

15. The shifting mechanism of claim 14 additionally including means for sensing and providing a signal indicative of said shift shaft-shift finger in said axially centered position.

16. The shifting mechanism of claim 8 wherein said means for selectively axially and rotatably moving said shift shaft-shift finger assembly comprises a shift lever engagable with said bridge portion for imparting an axial and rotational movement thereto.

17. The shifting mechanism of claim 8 wherein said means for imparting a selective axial and rotational movement to said shift shaft-shift finger assembly comprises a linkage including a torque arm member fixedly attachable to one end of said shift shaft for rotational and axial movement therewith.

18. The shifting mechanism of claim 8 wherein each of said shift rails is provided with a relatively shallow neutral positioning detent notch on one of said bottom and top surfaces thereof, all of said neutral positioning detent notches aligned when said shift rails are in the axially nondisplaced neutral positions thereof and said housing is provided with a neutral detent shaft extending substantially parallel to said shift shaft and aligned with said neutral positioning detent notches, said detent shaft having a length sufficient to be received in all of the aligned neutral detent notches and resiliently biased toward said shift rails.

19. The shifting mechanism of claim 18 wherein all said shift rails have an in-gear detent notch therein located adjacent said neutral detent notches, said in-gear detent notches axially spaced from said neutral detent notches so that the in-gear detent notches of an axially displaced shift rail in the in-gear position thereof will align with the neutral detent notches of the remaining shift rails in the nondisplaced neutral positions thereof whereby said single detent shaft will be simultaneously received in the neutral detent notches of the axially centered shift rails and the in-gear detent notch of the axially displaced shift rail.

20. A shifting mechanism for a change gear transmission comprising;

a shift mechanism housing mountable to a change gear transmission;

a plurality of substantially parallel generally equal width shift rails mounted for selective axial movement in said housing, each of said shift rails operatively connected to shift elements for engaging and disengaging selected gears, each of said shift rails having an axially nondisplaced neutral position and at least one axially displaced in-gear position, each of said shift rails having a transversely extending shift notch on one of the upper and lower surfaces thereof adapted for engagement by a shift finger and a transversely extending through interlock notch on said one of the upper and lower surfaces thereof, said interlock notches defined by outwardly flaired side walls of said shift notches, all of said shift notches aligning when all of said shift rails are in an axially nondisplaced neutral position, all of said interlock notches aligning when all of said shift rails are in an axially nondisplaced neutral position;

a shift shaft-shift finger assembly mounted in said housing for axial movement along and rotatable movement about an axis extending substantially transverse to the axes of said shift rails, said shift shaft-shift finger assembly comprising a shift shaft mountable in said housing for axial movement along and rotational movement about its axis in said housing, said shift shaft axially slidable within the space partially defined by the peripheral surfaces of said interlock notches of those shift rails in the nondisplaced neutral positions thereof and adapted to interfere with the peripheral surface of said interlock notches to prevent substantial axial movement of said shift rails from the axially nondisplaced neutral positions thereof, said shift shaft having a reduced cross section portion defining a gap therein having a width greater than the thickness of one shift rail but less than the thickness of two shift rails, said gap permitting axial movement therethrough of a shift rail aligned therewith from the axially nondisplaced position of said shift rail aligned with said gap, said shift shaft-shift finger assembly further comprising a shift finger fixed to said shift shaft for axial movement along and rotational movement about the axis of said shift shaft therewith and having a surface engagable with the shift notch of an aligned shift rail for imparting a selected axial movement to said aligned shift rail, said shift finger extending radially outwardly from and aligned with said gap whereby alignment of said shift finger with a selected shift rail will align said gap with said selected shift rail allowing selected axial movement of said selected shift rail while preventing substantial axial movement of all of the shift rails not aligned with said shift finger from the axially nondisplaced neutral position thereof; and means drivingly attachable to said shift shaft-shift finger assembly to selectively axially move said assembly along the axis of said shift shaft and to selectively rotate said assembly about the axis of said shift shaft.

21. The shifting mechanism of claim 20 wherein said shift rails are each of a substantially identical substantially rectangular cross-section defined by parallel side walls and parallel top and bottom walls, said shift notches and said interlock notches are provided in said top walls of said shift rails, said shift and interlock notches extending from side wall to side wall of said shift rails.

22. An improved interlock structure for a shift bar housing assembly for a change gear transmission of the type comprising a plurality of generally equal width axially shiftable shift rails each carrying shifting elements therewith and having an axially nondisplaced neutral position and at least one axially displaced in-gear position, each of said shift rails provided with a shift notch on one of the upper and lower surfaces thereof all of which shift notches will align when all of said shift rails are in the axially nondisplaced positions thereof and a shift shaft mounted generally transverse the axes of said shift rails and carrying a shift finger engageable with said shift notches fixed thereto for axial and rotational movement therewith, said shift shaft axially movable along and rotationally movable about its axis, the improved interlock structure comprising:

each of said shift rails provided with an interlock notch in the other of the upper and lower surfaces thereof, all of said interlock notches aligning when all of said shift rails are in the axially nondisplaced positions thereof, the peripheral surfaces of said interlock notches, when aligned, defining the space in which said shift shaft is axially movable and engaging said shift shaft upon axial displacement from the axially nondisplaced positions of said shift rails, said shift shaft comprising two coaxial axially displaced shaft portions defining a gap in the space between the opposed ends thereof, said gap aligned with said shift finger and having a width greater than the thickness of said shift rails but less than twice the thickness of said shift rails, said gap permitting axial movement of an aligned shift rail therethrough whereby said shift rails are axially displacable only one at a time from the axially nondisplaced positions thereof and only a shift rail aligned with said shift finger is axially displacable from the axially nondisplaced position thereof.

23. The improved interlock structure of claim 22 wherein said interlock notches are aligned along the axis of said shift rails with said shift notches.

24. The improved interlock structure of claim 22 wherein said shift finger is carried by a bridge member extending parallel to and spaced from the axis of said shaft, said bridge member having one end thereof fixed to each of shift portions and spanning said gap, said finger extending from said bridge portion radially inwardly toward the axis of said shaft portions.

* * * * *